…

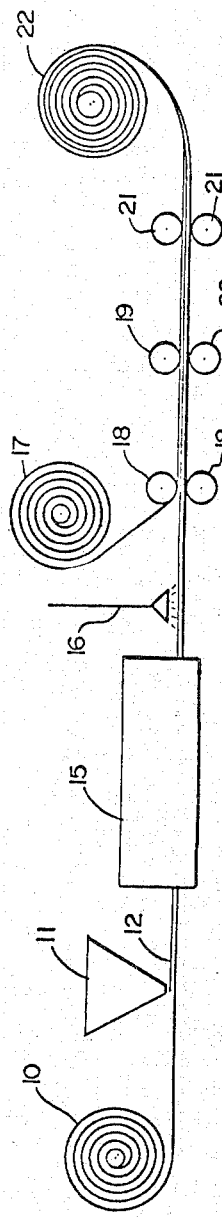
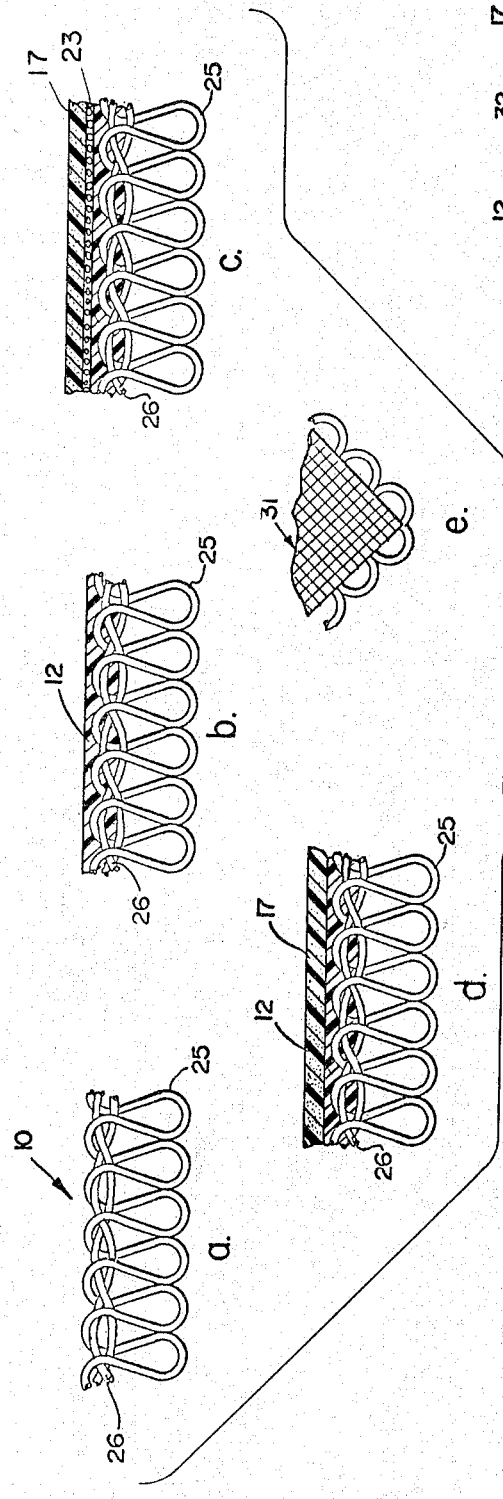
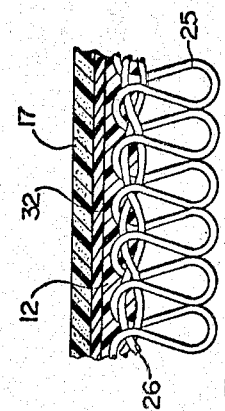
FIG. 1
FIG. 2
FIG. 3

United States Patent Office 3,695,987
Patented Oct. 3, 1972

3,695,987
FOAM-BACKED CARPETS
Reuben Wisotzky, Lexington, and Richard E. Petersen, Concord, Mass., assignors to Pandel, Inc., Lowell, Mass.
Original application Dec. 4, 1967, Ser. No. 687,608, now Patent No. 3,560,284, dated Feb. 2, 1971. Divided and this application Sept. 15, 1970, Ser. No. 72,519
Int. Cl. D03d 27/00; B32b 5/18
U.S. Cl. 161—67
18 Claims

ABSTRACT OF THE DISCLOSURE

An integral tufted carpet, which carpet comprises in combination: a base fabric sheet comprising thermoplastic fibers, which fibers are subject to shrinkage at temperatures in excess of about 200° F.; tufted yarns secured through and to said base fabric sheet to provide a tufted pile face surface and yarn loops on the back surface; a layer of a fused vinyl chloride resin plastisol composition bonded to the back surface, the fused layer substantially filling the interstices between the tufted yarn loops and the base fabric, the fused plastisol composition the sole adhesive employed to lock the tufted yarns to the base fabric, the thermoplastic fibers of the base fabric maintained in substantially nonheat-shrinkable form; and a layer of a thermoplastic foam, one surface of the foam sheet bonded to the surface of the fused plastisol composition, the layers bonded to each other solely by the melted and cooled surfaces of the thermoplastic vinyl chloride resin and the foam.

---

This application is a divisional application of Ser. No. 687,608, filed Dec. 4, 1967 now U.S. Pat. 3,560,284.

BACKGROUND OF THE INVENTION

This invention relates to improved tufted rugs and carpets and, more particularly, to tufted carpets having closed-cell foam backings integrally associated therewith and a process of preparing such rugs and carpets.

Tufted rugs and carpets are manufactured by threading pile yarns e.g. by needling, through a backing or base fabric to form pile loops. The base fabrics are woven, non-woven or combinations of woven and non-woven fabrics. In the past the backings have been composed of cotton duck or jute but now the employment of synthetic backing material composed of thermoplastic yarns such as polyolefins, preferably polypropylene, polyamides, polyesters and polyacrylics are coming into prominence.

Generally, the backing and pile loops are locked together by the application of a binder, for example natural and/or synthetic polymeric lattices. A foam backing to provide cushioning and non-skid effects is applied in the form of a foamable latex composition which either is applied unfoamed and then foamed in place by means of blowing agents or by first foaming the latex composition, as by aeration, and then applying it to the backing and then gelling and curing the foam.

The foamed carpeting prepared in this manner, while satisfactory for many uses, is generally unsatisfactory for outdoor use or for use in situations where moisture may contact the carpeting, since the foam is of the open-cell type which will receive and retain moisture. Such open-cell foam structures are also undesirable where the carpeting is adhesively secured to flooring. Deterioration of the foam through chemical action with the adhesives often occurs or the foam has insufficient internal strength to permit the removal of the carpeting from the floor without delamination of the foam.

Closed-cell foams have been adhesively secured to backings in the past; however, the adhesives available for such purposes are unsatisfactory in that an insufficiently strong bond is formed. Delamination of the foam and the backing occurs too readily. Because of the thermoplastic nature of the base fabric, the use of heat-sealing techniques is undesirable because of the possibility of excessive shrinkage of the base fabrics or even melting the base fabric resulting in damage to the tufted portion of the carpet.

A method has now been found for producing an integral carpet having a closed-cell foam backing which is not subject to the deficiencies of the prior art.

SUMMARY OF THE INVENTION

The present invention is directed to forming an integral carpet structure by a method which includes bonding the tufted yarn loops to a thermoplastic backing fabric with a plastisol composition and then heat-sealing a thermoplastic backing sheet, preferably a closed cell foam, to the plastisol coating. More specifically, the method involves applying a heat-sensitive plastisol composition to the back of a thermoplastic base fabric to which are attached tufted yarns. Heat is then applied to the plastisol coating in order to fuse the plastisol to bond the tufted yarns which are loosely attached to the base fabric. After the tufted yarns and the base fabric are locked together, additional heat is applied to the surface of the plastisol. A relatively cold thermoplastic sheet i.e. a solid sheet, or, preferably, a closed-cell foam, is contacted with the heated plastisol surface. The temperature of the plastisol surface is sufficient to melt the contacting surface of the thermoplastic sheet, thereby bonding the thermoplastic sheet to the plastisol layer creating an integral structure.

It should be noted that the application of heat throughout the process is to the plastisol layer; first to fuse it, thereby locking the tufted yarns and the base fabric, and secondly, to provide the sole source of sensible heat to the relatively cold thermoplastic sheet to provide the heat sealing of the thermoplastic sheet to the tufted structure. Therefore, in the preparation of the carpet, according to the present invention a temperature gradient exists from the outer edges inward wherein the outer portions, i.e., the tufted yarns and the thermoplastic sheet are relatively cold in relation to the plastisol layer.

After the formation of the carpet, if a closed-cell foam is employed as the thermoplastic sheet, the outer surface of the foam is preferably densified to impart further strength to the carpet. This densification is achieved by applying heat and pressure to the outer surface of the foam thereby melting and collapsing the outer surface to provide a thickened skin. The thickness of the thus-formed skin can be varied in the discretion of the operator depending upon the degree of strength desired. Preferably the degree of densification employed is 3 to 5% of the initial thickness of the foam. In a particularly preferred embodiment, in addition to the densification of the foam, the foam is embossed, for example in a waffle-like pattern to provide for greater non-slip characteristics and for better adhesion when used with flooring adhesives.

A radiant energy reflective coating may be applied to one surface of the thermoplastic base fabric. This reflective coating may be applied prior to the application of the tufted yarns into the base fabric or after such tufted yarns have been inserted. The application of a radiant energy reflective coating to the thermoplastic base fabric prior to the application of the heat-sensitive plastisol composition and the subsequent fusing and heating steps provides still greater protection to the thermoplastic base fabric which is normally subject to shrinkage and/or melting.

Conventional radiant energy reflective compositions may be employed satisfactorily. Preferably metallic compositions, such as those containing aluminum, or white or light colored compositions are employed. The particular radiant energy reflective composition should be selected with regard to the plastisol composition to ensure that adhesion problems between the plastisol and base fabric don't arise. The radiant energy reflective surface may be applied by any conventional method known to the art, for example spraying, casting, roller coating and, particularly in the case of metal, vacuum deposition or sputter deposition. It should be noted that it is not critical that a continuous heat-reflective layer be formed.

In a particularly preferred method an aluminum-pigmented vinyl ink is employed.

Accordingly, the alternative embodiment of preparing the improved integral tufted pile carpets includes the steps of applying a radiant energy reflective surface to at least one surface of a thermoplastic base fabric and needling tufting yarns into the base fabric on the side of said base fabric opposite that which carries the radiant energy reflective surface. The tufting operation may be carried out either before or after the application of the radiant energy reflective surface. Preferably it is carried out after the reflective surface is applied. The base fabric is then coated with a plastisol composition which is fused to bond the tufted yarns to the base fabric. The outer surface of the plastisol composition is then treated with a high energy heat source to impart sufficient sensible heat to the top surface of the plastisol composition to melt a thermoplastic sheet when said sheet is placed in contact with said surface thus providing the improved integral tufted carpet of the present invention.

BRIEF DESCRIPTION OF THE DRAWINGS

FIG. 1 is a schematic illustration of the novel process of the present invention.

FIG. 2(a) to (e) illustrates cross-sectional views of enlarged fragmentary materials at various steps of the process shown in FIG. 1.

FIG. 3 is a cross-sectional fragmentary view of alternative material prepared in an embodiment of the present invention.

DESCRIPTION OF THE PREFERRED EMBODIMENT

Tufted material 10 composed of loops 25 secured to base fabric 26 is coated with heat-sensitive plastisol 12 from reservoir 11. The product is then heated in oven 15 to fuse the plastisol and secure the tufted loops to the base fabric. The coated material then passes under high intensity heat source 16 to impart sufficient sensible heat to the plastisol coating to provide a heat seal to the relatively cool closed-cell foam layer 17 thereby adhering said foam to the plastisol layer as the foam and coated material pass through pressure rolls 18. Optionally, embossing roll 19 is employed with pressure roll 20 to densify the outer surface 29 of the closed-cell foam and to emboss a pattern 31, such as a waffle-like pattern, on the outer surface of the foam.

Cooling rolls 21 are also optionally employed before the finished carpet 22 is rolled.

In FIG. 3 a cross-sectional portion of a carpet is shown wherein a radiant energy reflective layer 32 is applied to the base fabric after the application of the plastisol coating composition.

The tufted yarns suitable for employment in the present invention comprise any of the conventional materials, for example, wool, cotton, nylon, acrylic, modacrylic and the like.

The base fabric to which the tufted yarns are applied comprise woven or non-woven webs of thermoplastic yarns or fibers. As examples of suitable thermoplastic materials mention may be made of polyolefins, such as polypropylene and polyethylene, polyamides, polyesters, polyacrylics, vinyls such as vinyl chloride, and the like. Combinations of thermoplastic webs with other textile yarns such as cotton, jute, rayon and paper are also employed.

The plastisol is preferably polyvinyl chloride or a vinyl chloride copolymer. In a preferred embodiment low molecular weight, dispersion grade resin is employed. In a particularly preferred embodiment a vinyl chloride/vinyl acetate copolymer is employed wherein the vinyl acetate component of the copolymer is in the range of 5 to 15% by weight. If desired, conventional plasticizers such as dioctyl phthalate are employed. Plasticizers are employed at a level of 60 to 120 parts of plasticizer per 100 parts of resin on a weight basis. Preferably 90 parts of plasticizer per 100 parts of resin is employed. A particularly preferred composition is as follows:

| | Parts by weight |
|---|---|
| Dispersion grade resin copolymer (90 parts vinyl chloride 10 parts vinyl acetate) | 100 |
| Dioctyl phthalate | 90 |
| Epoxidized soy bean oil | 90 |
| Barium-cadmium stabilizer | 3 |
| Thickener (silica aerogel) | 5 |

The viscosity of the plastisol composition should be such that it will flow sufficiently to fill in the interstices between the tufted yarns and the fibers of the base fabric to lock the tufted yarns to the base fabric. No loss of resiliency in the carpet results from the filling of the interstices because of the thermoplastic nature of the plastisol. The plastisol also covers the outer fibers of the base fabric sufficiently to prevent excessive melting or shrinkage of the base fabric. If desired, thickening agents conventionally employed with plastisols are employed to prevent the excessive penetration of the plastisol into the base fabric and through to the outer surface of the tufted loops. It is necessary, however, that the viscosity of the plastisol be selected so that sufficient penetration be achieved to bond the tuft yarns to the base fabric and that sufficient plastisol be retained on the outer surfaces of the base fabric to permit the bonding of the base fabric to the thermoplastic sheet.

In a particularly preferred embodiment, the plastisol is applied in at least two applications wherein the first application is employed to lock the tufted yarns to the base fabric and fill the interstices, and the second, of a considerably higher viscosity is employed to be held on the outer surfaces of the base fabric to provide the bonding of the base fabric to the thermoplastic sheet.

The thermoplastic sheet is employed to provide strength and lay-flat, particularly if the carpeting is to be cemented to the flooring. Preferably the thermoplastic sheet is a closed-cell foam such as a polyvinylchloride foam or a polyurethane foam. The density of the thermoplastic sheet employed ranges from 10 pounds per cubic foot to up to a solid sheet. Preferably, a foam having a density of 20 pounds per cubic foot is employed. The coating weight of the thermoplastic layer is generally 1 to 4 pounds per square yard preferably 2 pounds per square yard with a thickness of 0.050 to 0.300 inch, preferably 0.150 inch.

In the present invention the plastisol is applied by conventional means, for example, by doctor blade, by spraying, by roller coating, or by extrusion. Because of the viscosity of the material, a doctor blade is preferably employed in applying a plastisol composition.

After the application of the plastisol, heat is applied to the side of the structure upon which the plastisol has been coated in order to fuse the plastisol, thus locking the tufted yarns to the base fabric and, at the same time, protecting the thermoplastic components of the base fabric from excessive shrinkage or melting. It is not necessary to heat the entire structure in order to fuse the plastisol, in fact, it is preferable that the heat be applied only to the plastisol coating. Accordingly, even though an oven or some such source of heat is employed, the heat is directed only to that side of the structure on which the plastisol is located. After the plastisol has been fused, heat from a high intensity heat source, such as infra-red lamps or a flame, is applied to the surface of the plastisol to raise the temperature sufficiently to melt the thermoplastic sheet when it contacts the plastisol layer, thus forming the bond. The temperature of the plastisol coating is preferably in excess of 350° F., more preferably 400° F. at the time of lamination. It should be noted that the thermoplastic sheet is not heated nor is the tufted pile side of the structure heated. The temperature of the materials other than the surface of the plastisol is preferably maintained as cool as possible e.g. below 200° F. Where a closed-cell foam is employed, the application of heat is especially to be avoided since excessive heat can cause the collapse of the foam.

Densification and embossing of the thermoplastic layer are achieved through contacting the layer with a heated roll which partially melts the outer surface to provide a 3 to 5% reduction in the thickness.

The novel process of the present invention can be employed with both a solid sheet of thermoplastic material and a closed-cell foam backing material. Closed-cell foam is particularly preferred since the method of this invention is the only method which permits the heat-sealing of a heat-sensitive backing element to a synthetic thermoplastic base fabric. Since the thermoplastic backing sheet is pre-formed it can be colored to match the color of the tufted yarns so that damage or wear to the carpet surface will expose a material of the same color thereby making the damage or wear unobvious whereas in a rug employing, for example, latices, the different color of the latex backing material would be readily apparent.

Other attempts to secure closed-cell foams to carpeting have been less than satisfactory since conventional adhesives are not satisfactory particularly where the carpet is to be cemented to flooring. Closed-cell foam backing also cannot be achieved by an in-situ foaming process.

In still another embodiment the back of the base fabric carrying the tufted yarns is contacted under pressure with a thermoplastic sheet, while, at the same time a plastisol composition is introduced between said base fabric and said thermoplastic sheet. The adhesive which is fluid when heated, will penetrate the base fabric to lock the tufted yarns to said base fabric and, at the same time melt and bond the thermoplastic sheet to the base fabric. In this alternate embodiment it should be noted that the only heat in the process is applied to the plastisol composition and that the tufted portion and thermoplastic sheet are relatively cool. If desired, a pre-coat of plastisol composition is applied to the base fabric to bond the yarns to the base.

In the finished product the strength of the heat seal is such that any attempt to separate the foam from the fabric base results in delamination of the foam and not in the destruction of the bond provided by the heat sealing.

What is claimed is:

1. An integral tufted carpet, which carpet comprises in combination:
    (a) a base fabric sheet comprising thermoplastic fibers, which fibers are subject to shrinkage at temperatures in excess of about 200° F.;
    (b) tufted yarns secured through and to said base fabric sheet to provide a tufted pile face surface and yarn loops on the back surface;
    (c) a layer of a fused vinyl chloride resin plastisol composition bonded to the back surface, the fused layer substantially filling the interstices between the tufted yarn loops and the base fabric, the fused plastisol composition the sole adhesive employed to lock the tufted yarns to the base fabric, the thermoplastic fibers of the base fabric maintained in substantially non-heat-shrinkable form; and
    (d) a layer of a thermoplastic foam, one surface of the foam sheet bonded to the surface of the fused plastisol composition, the layers bonded to each other solely by the melted and cooled surfaces of the thermoplastic vinyl chloride resin and the foam.

2. The carpet of claim 1 which includes a radiant energy reflective layer bonded to the back surface of the base fabric and between the back surface and the layer of the fused plastisol composition.

3. The carpet of claim 2 wherein the radiant energy reflective layer includes an aluminum pigmented vinyl composition.

4. The carpet of claim 1 wherein the thermoplastic foam comprises a vinyl chloride resin.

5. The carpet of claim 1 which includes a thickened outer skin on the thermoplastic foam.

6. The carpet of claim 1 wherein the layer of the fused vinyl chloride plastisol composition comprises a first layer of a thickness sufficient to lock in the yarn loops to the base sheet, and a second layer bonded thereto, the surface of which second layer is bonded to the foam.

7. The carpet of claim 1 wherein the thermoplastic foam is a closed-cell foam.

8. The carpet of claim 1 wherein the thermoplastic base fabric comprises polypropylene resin fibers and the fiber tufted through the base comprises a polyamide resin.

9. The carpet of claim 1 wherein the base fabric sheet is a similar color as the color of the tufted face surface.

10. The carpet of claim 1 which includes a thickened outer skin on the foam sheet and an embossed design on the thickened skin surface.

11. An integral tufted carpet, which carpet comprises in combination:
    (a) a base fabric sheet comprising polypropylene resin fibers, which fibers are subject to shrinkage at temperatures in excess of about 200° F.;
    (b) tufted yarns comprising a polyamide resin secured through and to said base fabric sheet to provide a tufted pile face surface and yarn loops on the back surface;
    (c) a layer of a fused vinyl chloride resin plastisol composition bonded to the back surface, the fused layer substantially filling the interstices between the tufted yarn loops and the base fabric, the fused plastisol composition the sole adhesive employed to lock the tufted yarns to the base fabric, the thermoplastic fibers of the base fabric maintained in substantially non-heat shrinkage form; and
    (d) a layer of a closed-cell vinyl chloride resin foam, one surface of the foam sheet bonded to the surface of the fused plastisol composition, the layers bonded to each other solely by the melted and cooled surface of the thermoplastic closed-cell vinyl chloride resin and foam.

12. The carpet of claim 11 wherein the layer of the fused vinyl chloride plastisol composition comprises a first layer of a thickness sufficient to lock in the yarn loops to the base sheet, and a second layer bonded thereto, the surface of which second layer is bonded to the foam sheet.

13. The carpet of claim 11 which includes a thickened outer skin on the closed-cell thermoplastic foam sheet and an embossed design on the skin surface.

14. The carpet of claim 11 which includes a radiant energy reflective layer bonded to the back surface of the base fabric and between the back surface and the layer of the fused plastisol composition.

15. An integral tufted carpet which carpet comprises in combination:
    (a) a base fabric sheet comprising thermoplastic fibers;
    (b) tufted yarns secured through and to the base fabric sheet to provide a tufted pile face surface and yarn loops on the back surface;
    (c) a radiant energy reflective layer bonded to the back surface of the base fabric;
    (d) a layer of a fused vinyl chloride resin plastisol composition, the fused plastisol composition locking the tufted yarns to the base sheet; and
    (e) a layer of a thermoplastic foam sheet material, one surface of which is bonded to the layer of the fused plastisol composition.

16. The carpet of claim 15 wherein the thermoplastic layer is a closed-cell thermoplastic foam sheet.

17. The carpet of claim 15 wherein the radiant energy reflective layer contains aluminum.

18. The carpet of claim 15 which includes a thickened outer skin on the closed-cell foam sheet.

References Cited

UNITED STATES PATENTS

| | | | |
|---|---|---|---|
| 2,918,702 | 12/1959 | Wetterau | 161—160 UX |
| 3,293,105 | 12/1966 | Koller | 161—67 |
| 3,322,606 | 5/1967 | Koller | 161—67 |
| 3,441,464 | 4/1969 | Blue | 156—148 |
| 3,486,920 | 12/1969 | Sington | 161—67 |
| 3,537,946 | 11/1970 | Truax et al. | 161—67 |
| 3,573,147 | 3/1971 | Elbert | 161—67 |

156—72, 306; 161—159, 160, 227, 254, 410

U.S. Cl. X.R.

WILLIAM J. VAN BALEN, Primary Examiner